G. H. CURTISS.
AIRPLANE WING CONSTRUCTION.
APPLICATION FILED MAY 31, 1918.
1,364,614.
Patented Jan. 4, 1921.
2 SHEETS—SHEET 2.
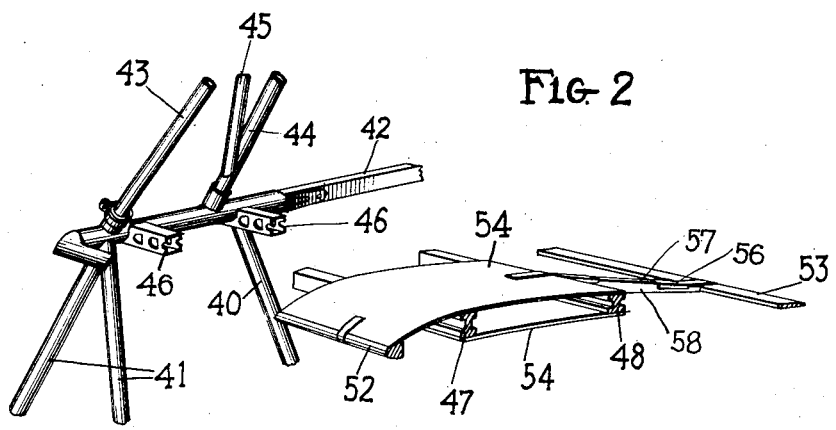
Fig. 2
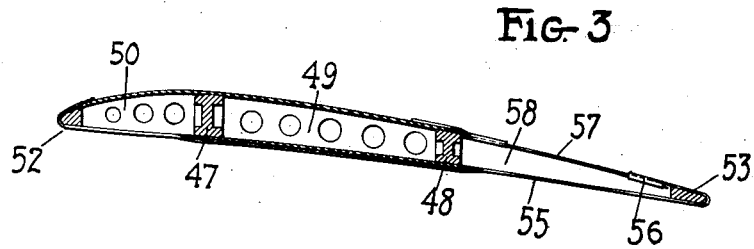
Fig. 3
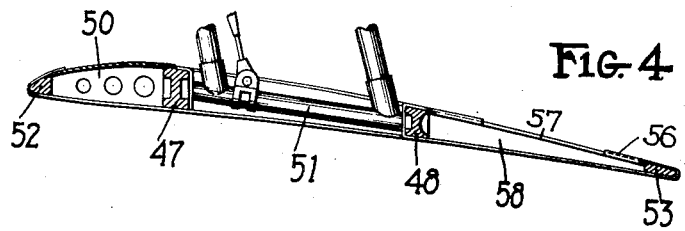
Fig. 4
Fig. 5
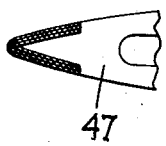
Inventor
GLENN H. CURTISS.
By Attorney

UNITED STATES PATENT OFFICE.

GLENN H. CURTISS, OF GARDEN CITY, NEW YORK, ASSIGNOR TO CURTISS AEROPLANE AND MOTOR CORPORATION, A CORPORATION OF NEW YORK.

AIRPLANE-WING CONSTRUCTION.

1,364,614. Specification of Letters Patent. Patented Jan. 4, 1921.

Original application filed December 22, 1916, Serial No. 138,498. Divided and this application filed May 31, 1918. Serial No. 237,454.

*To all whom it may concern:*

Be it known that I, GLENN H. CURTISS, a citizen of the United States, residing at Garden City, in the county of Nassau and State of New York, have invented certain new and useful Improvements in Airplane-Wing Construction, of which the following is a specification.

My invention relates to improvements in airplane wing construction and is a division of application Serial No. 138,498 filed Dec. 22, 1916. As therein pointed out the object of the invention is to lighten and at the same time improve the structure of the wing or supporting surface of an airplane by eliminating the interior wing wiring and constructing the wing frame as a box beam, letting the wing beams or spars enter into and actually constitute a part of the box beam itself. In attaining this object veneering (preferably) is used in conjunction with the wing spars in the formation of the box beam. The wing spars are spaced in the usual manner and connected by the veneering which is securely fastened to the wing spars whereby a box beam of considerable depth (fore and aft) is evolved. A beam thus constructed is strong, light, and by reason of its depth, capable of withstanding effectually both the drift and anti-drift stresses set up in the wing when in use. Moreover, the use of veneering in the manner specified is advantageous in that sagging of the wing covering (fabric) is prevented intermediate the wing beams and the true profile of the wing section maintained throughout the full length of the wing.

Of the drawings:

Fig. 2 is a view illustrating fragmentarily and in perspective a portion of the engine section of the fuselage of an airplane and that portion of the wing in the immediate vicinity thereof;

Fig. 3 is a cross section of the wing;

Fig. 4 is a similar view illustrating the wing post connection with the wing; and Fig. 5 is a detail of one of the wing spar terminals.

Figure 1:
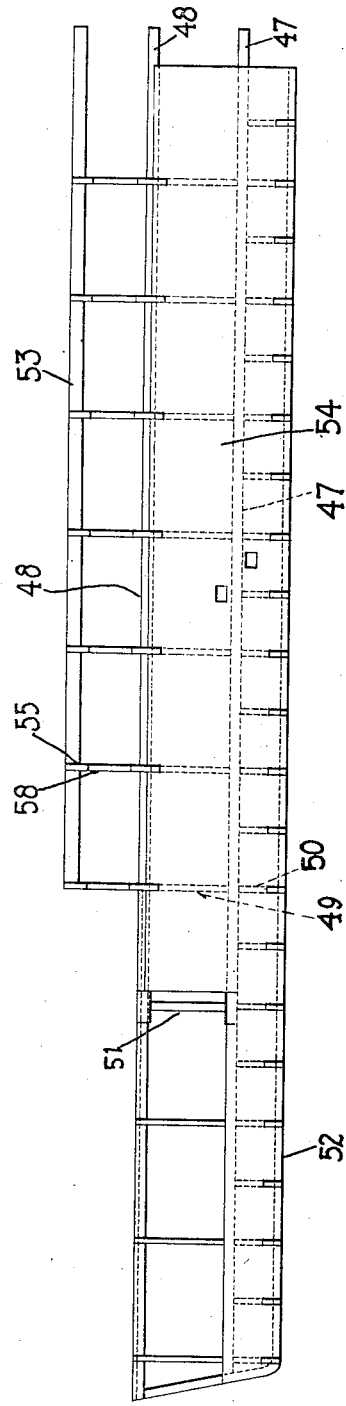
Figure 1 is a plan view of the wing with its fabric covering removed.

Since this application is a division of an application wherein a complete airplane is disclosed and since it relates to the wing construction *per se* a detail description of the airplane in its entirety will not be given; only the details of the wing structure or supporting surface frame work will be disclosed. By way of illustration however there is disclosed in Fig. 2 of the drawings a fragment of the engine section of an airplane fuselage comprising longerons 42 (but one of which is shown) fuselage struts 40 and 41, wing beam sockets 46 and a fuselage wing post comprising post sections 43, 44 and 45. These related parts have nothing whatsoever to do with the invention hereinafter claimed as they constitute only a preferred mounting for the particular wing selected for illustration herein.

The wing comprises wing beams 47 and 48 (channeled and lightened), lightened web strips 49, similarly formed nose strips 50, compression members or tubes 51, an entering edge strip 52, and a trailing edge strip 53, the entering edge strip continuing at the wing tip aft for connection with the rear wing beam 48, as illustrated in Fig. 1.

Ordinarily the veneering or inner wing covering terminates aft in the plane of the forward wing beam, the said veneering commencing at the entering edge strip 52. In the present instance, however, the veneering 54 on the upper side of the wing extends beyond the forward wing beam 47 for termination in the plane of the rear wing beam 48 to which it is secured by any suitable means. Said veneering together with a veneering strip 54' arranged to extend from beam to beam on the under side of the wing, strengthens the wing structure throughout and provides or rather permits of the elimination of all drift or anti-drift internal wing wires. In fact the wing frame comprising elements 47, 48, 54 and 54' constitutes a hollow box beam of considerable depth. The web strips 49 and the nose strips 50, with the several longitudinals of the wing constitute a foundation for this veneering and for the fabric covering (not designated) of the wing. Metal strips 55 underlie the several web and nose strips and overlap respectively the entering edge strip and trailing edge strip as seen in Fig. 3. By this arrangement the terminals of this said metal strip may be described as reversely folded or extended. Said strips effectually transversely brace the wings and steadfastly secure the underneath veneering 54'. The fastening means for the strips 55 may be of any character desired but it is preferred that the rear terminals of said strips be enlarged as indicated at 56 and folded (see Figs. 3 and 4) for securement beneath the cap strips 57 of the web strips 58 located intermediate the rear wing beam and the trailing edge strip of the wing. These web strips 58 are preferably in alinement with the web strips 49 and 50.

This, it is believed, is the first instance of a wing frame constructed as a box beam in which the box-beam is of a depth fore and aft less than the corresponding depth of the wing though of sufficient depth to make the use of additional beams unnecessary. The veneering 54 and 54' together with the beams 47 and 48 constitute said box beam and permit of the complete elimination of both drift and anti-drift internal wing wiring. Moreover, they completely inclose the web strips 49. The drift and anti-drift stresses are effectually borne by a materially lightened wing which, because of the great depth of the box beam, has a high factor of safety even under extreme conditions of flight. In addition to the elimination of the internal wing wiring a box beam is preferred for the reason that sagging of the wing covering is prevented; also whipping of the fabric due to the propeller blast (in a tractor machine) thereon. In eliminating the sagging of the fabric the profile or cross sectional area of the wing is held constant throughout its full length with the result that its efficiency is increased and made to correspond with the calculated efficiency as determined by calculations based upon a wing of given curve. The length of the box-beam (referring to its dimension longitudinally of the wing) is immaterial. It may be terminated short of the wing, as illustrated in Fig. 1, or it may be interrupted in part by dispensing with the veneer covering at intervals throughout the length of the front and rear wing beams 47 and 48.

While I have described my invention in detail in its present preferred embodiment, it will be obvious to those skilled in the art after understanding my invention that various changes and modifications may be made therein without departing from the spirit or scope thereof. I aim in the appended claims to cover all such modifications and changes.

What is claimed is:

1. An airplane wing including a hollow box-beam of a depth fore and aft less than the depth of the wing though of sufficient depth to extend respectively well forward and well aft of the mean center of pressure.

2. An airplane wing including a hollow box beam of a depth fore and aft less than the depth of the wing though of sufficient depth to extend respectively well forward and well aft of the mean center of pressure, the box beam comprising a forward beam located nearer to the leading edge than to the trailing edge of the wing, a rear beam located nearer to the trailing edge than to the leading edge of the wing and top and bottom rigid connections respectively between said beams.

3. An airplane wing including a front wing beam located nearer to the leading edge thereof than to the trailing edge, a rear wing beam located nearer to the trailing edge than to the leading edge of the wing, a nose strip, a rigid top wing covering extending back from the front wing beam to the rear wing beam though terminating short of the trailing edge of the wing, and a rigid bottom wing covering likewise extending back from the front wing beam to the rear wing beam and terminating short of the trailing edge, the top and bottom covering and the wing beams together constituting a hollow box beam of a depth fore and aft less than the depth of the wing, though of sufficient depth to extend respectively well forward and well aft of the mean center of pressure.

4. An airplane wing including a front wing beam, a rear wing beam, a nose strip, a rigid top wing covering extending back from the nose strip to the rear wing beam though terminating short of the trailing edge of the wing and a rigid bottom wing beam covering extending back from the front wing beam to the rear wing beam and likewise terminating short of the trailing edge of the wing, the top and bottom covering and the two wing beams together constituting a single hollow box-beam of a depth less than the depth of the wing though of sufficient depth to make the use of additional beams unnecessary.

5. An airplane wing including a front wing beam, a rear wing beam, a nose strip, a rigid top wing covering extending back from the front wing beam to the rear wing beam though terminating short of the trailing edge of the wing, a rigid bottom covering likewise extending back from the front wing beam to the rear wing beam and likewise terminating short of the trailing edge of the wing, the top and bottom covering and the two wing beams together constituting a hollow box-beam of a depth fore and aft less than the depth of the wing, and fore and aft web strips inclosed in the hollow box-beam to interconnect the front and rear wing beams which form a part thereof.

6. An airplane wing including two wing beams, one of said beams being located nearer the leading edge than the trailing edge of the wing and the other of said beams nearer the trailing edge than the leading edge of the wing, a nose strip, web strips extending back from the nose strip to the first mentioned beam, web strips extending back from the first mentioned beam to the beam located nearer the trailing edge than the leading edge, web strips extending back from the last mentioned beam to the trailing edge, a rigid top wing covering extending from one to the other of the said two beams, and a rigid bottom wing covering likewise extending from one to the other of said two beams, said two beams and the top and bottom covering together constituting a hollow box-beam of a depth fore and aft considerably less than the corresponding depth of the wing, the nature of the box-beam being such that one or more of the web strips extending from one to the other of the two beams are inclosed therein.

In testimony whereof I hereunto affix my signature.

GLENN H. CURTISS.